United States Patent [19]

Breed

[11] Patent Number: 4,573,706
[45] Date of Patent: Mar. 4, 1986

[54] PASSENGER COMPARTMENT SENSOR REQUIRING SUBSTANTIAL VELOCITY CHANGE

[75] Inventor: David S. Breed, Boonton Township, Morris County, N.J.

[73] Assignee: Breed Corporation, Lincoln Park, N.J.

[21] Appl. No.: 580,337

[22] Filed: Feb. 15, 1984

[51] Int. Cl.⁴ .................................................. B60R 21/32
[52] U.S. Cl. ..................................... 280/734; 180/282; 280/731
[58] Field of Search ............... 280/728, 731, 734, 735; 180/282; 200/61.53

[56] References Cited

U.S. PATENT DOCUMENTS

| | | | |
|---|---|---|---|
| 2,649,311 | 8/1953 | Hetrick | 280/734 |
| 3,563,024 | 2/1971 | Breed | 267/114 |
| 3,859,650 | 1/1975 | Prachar | 280/735 |
| 4,116,132 | 9/1978 | Bell | 200/61.53 |
| 4,167,276 | 9/1979 | Bell et al. | 280/731 |
| 4,172,603 | 10/1979 | St. Clair et al. | 280/734 |

Primary Examiner—Joseph F. Peters, Jr.
Assistant Examiner—Kenneth R. Rice
Attorney, Agent, or Firm—Kane, Dalsimer, Kane, Sullivan and Kurucz

[57] ABSTRACT

A passenger compartment mounted sensor senses crashes when located outside of the crush zone in response to velocity changes. The velocity change needed to fire the sensor is much greater than the velocity change associated with overcoming the sensor bias.

15 Claims, 11 Drawing Figures

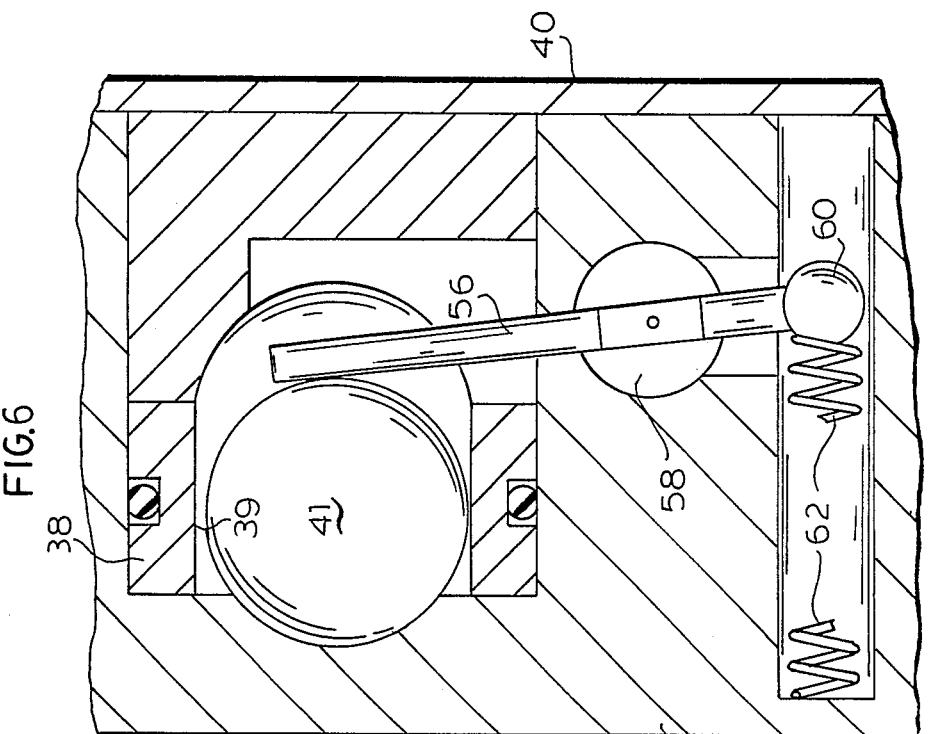
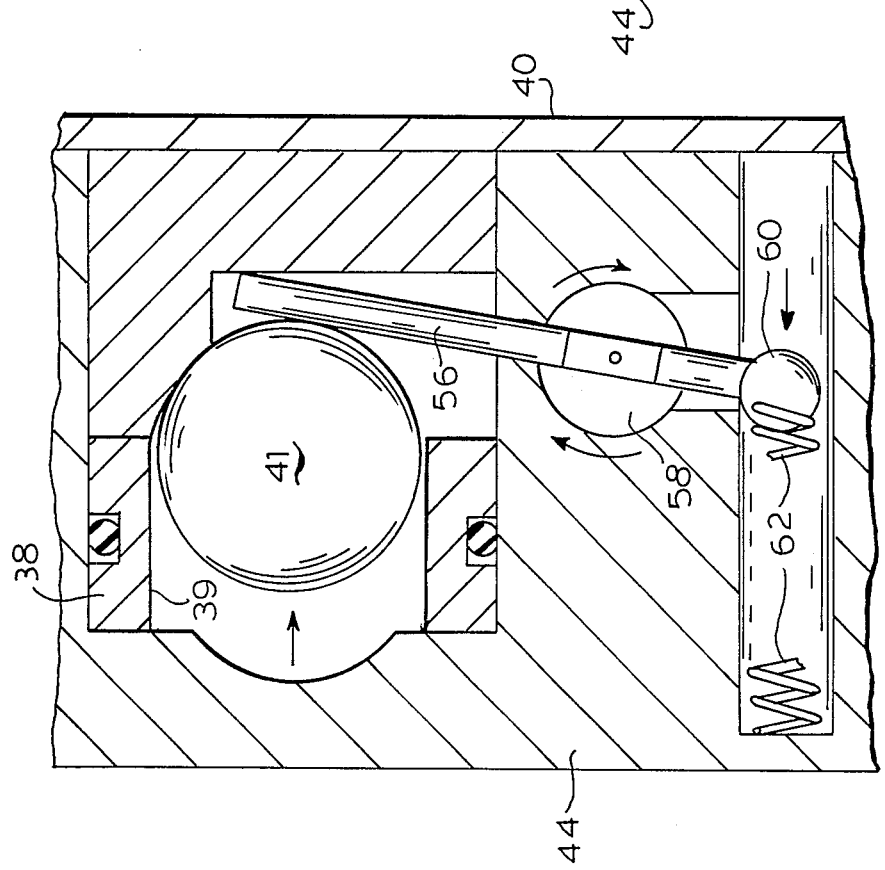

PASSENGER COMPARTMENT SENSOR REQUIRING SUBSTANTIAL VELOCITY CHANGE

BACKGROUND OF THE INVENTION

It has been found that in a 30 mph frontal barrier crash a restraining device such as an air bag must begin restraining the driver by the time the driver has moved forward about 5 inches if it is to prevent injury. Air bag inflating mechanisms require a period of time, such as 30 milliseconds, to effect inflation of the air bag once a signal initiating inflation has been received from a sensor.

It is also been determined that a passenger protective device is needed in accidents in which movement of the vehicle occupant relative to the vehicle reaches a velocity of 12 mph or greater. Thus, a sensor is required which will determine that the occupant will collide with some portion of the vehicle's interior at a speed of 12 mph or greater and makes this determination of a 30 mph frontal barrier or equivalent crash to initiate air bag inflation 30 a period of time such as milliseconds before the occupant has moved forward 5 inches.

It is important that the air bag inflation means be responsive to the accleration of the passenger compartment rather than some other part of the vehicle because this location leads to certain advantages compared with other sensor locations. For example, if a front fender or bumper of the vehicle should collide with a pole or the like which breaks upon or shortly after impact, a sensor mounted on the front fender or bumper could experience a velocity change of 12 mph or greater before the pole breaks, whereas the passenger compartment of the vehicle might experience a negligble velocity change. Under these circumstances, inflation of the air bag is not required and if inflation occurs, it might even contribute to a subsequent accident. It is important, therefore, that the sensor or sensors with which a vehicle is equipped be located in such positions and be of such construction as to be predictive that the passenger compartment will undergo a velocity change necessitating passenger protection.

The mechanical crash sensor designs (as distinct from electronic) that have been made in the largest quantities are the spring mass sensors. The term "spring mass" or "undamped spring mass" as used herein means those sensors wherein the motion of the sensing mass is controlled only by the acceleration experienced by the sensor, its translational or rotational inertia and a bias force such as would result from a spring, a magnet or a rolomite type band. The spring mass sensor is known to function adequately in the case of crash pulses of extremely short durations. Such pulses are characteristic of head on crashes or standard barrier impacts. When the vehicle on which the sensor is mounted experience a deceleration level greater than the biasing force exerted by the spring on the sensing means, such as would accompany a crash, the sensing mass moves rapidly towards the forward end of the vehicle and initiates air bag inflation.

Heretofore, all known mechanical sensors for sensing automotive crashes outside of the crush zone have essentially been acceleration level detectors. General Motors Corporation used a sensor mounted on the cowl in the 10,000 air bag cars built in the 1970's that was a magnetically biased undamped ball. The initial bias was approximately 20 g but fell off very rapidly as the ball traveled from its rest position. Thus, for all practical purposes, once an acceleration of the 20 g was experienced, the sensor would fire. Control Laser Corporation employed a sensor using two detent balls that provided initial bias of something over 7 g. Once that level of acceleration was experienced, very little additional energy was required to fire the system. Another example is disclosed in the Bell Pat. No. 4,116,132. In this patent the sensor is described to be "responsive to a predetermined level of acceleration force."

It has been determined that for a sensor located outside of the crush zone to satisfy the requirements stated above, the sensor must be designed so that the velocity change needed to fire the sensor must be significantly larger than the velocity change which has occurred when the sensor bias is overcome.

It has also been determined that a sensor mounted outside of the crush zone and used alone for sensing automobile crashes must be biased below 7 g. If such a sensor is biased below 7 g, it must not be an acceleration level detector, since a 7g level can occur in cases where an air bag is not wanted. These facts have not been appreciated heretofore by those designing mechanical sensors, and thus up until now, mechanical sensors have been level detectors.

The prior art mechanical sensors when located within the passenger compartment inevitably failed to distinguish between actual crash conditions requiring an air bag and those conditions not requiring an air bag. For example, conditions not requiring an air bag car bottoming, travel over a curb or railroad track or even a pot hole. Yet the prior art mechanical sensors could trigger under such circumstances to inflate an air bag unnecessarily.

SUMMARY OF THE INVENTION

A principal object of the present invention is to provide a passenger compartment mounted mechanical sensor that will alleviate the problems inherent in and encountered by the prior art mechanical sensors when located outside of the crush zone and specifically in the passenger compartment.

Another object is to provide a sensor of the foregoing type which possesses a low bias and is responsive to velocity change which requires the acceleration, to be sustained for an extended period.

A principal object of this invention is to provide a sensor that senses crashes when located outside of the crush zone and one that is designed so that the velocity change needed to fire the sensor is much greater than the velocity change associated with overcoming the sensor bias.

BRIEF DESCRIPTON OF THE DRAWINGS

FIG. 6 is an enlarged framentary view of the mass and associated pin extending from the D-shaft prior to movement of the mass incident to a crash;

FIG. 7 is a similar view showing the means shifted as a result of a crash and the movement of the associated pin and the D-shaft;

DETAILED DESCRIPTION

Figure 1:
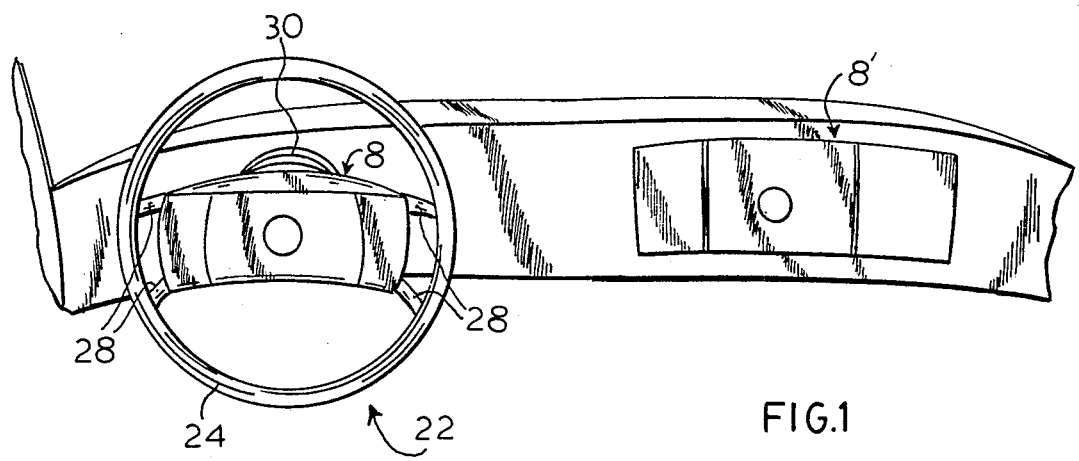
FIG. 1 is a schematic view of a passenger compartment of a vehicle showing air bag systems incorporating sensors of the invention.
Figure 2:
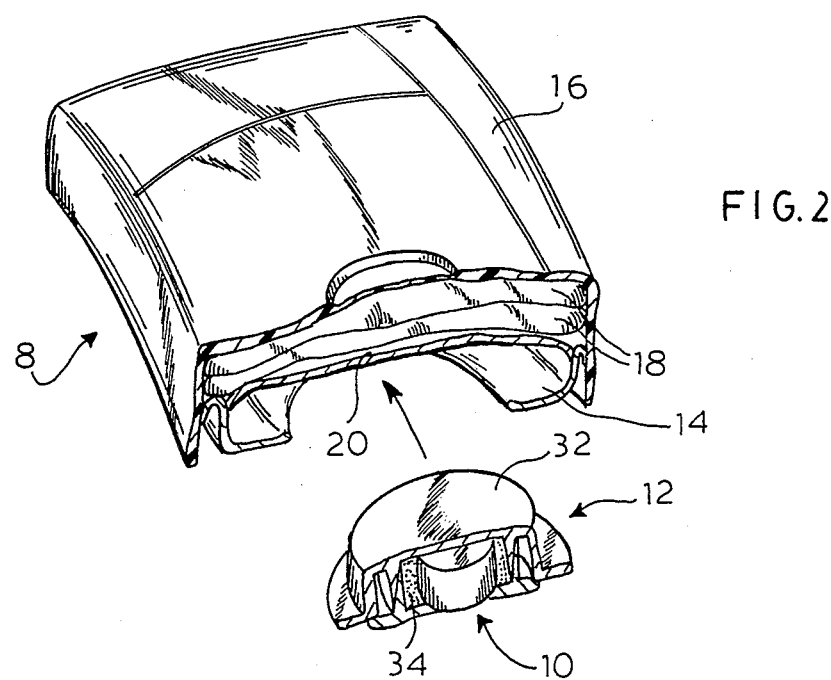
FIG. 2 is an exploded perspective view of the air bag system with certain parts broken away and removed.
Figure 4:
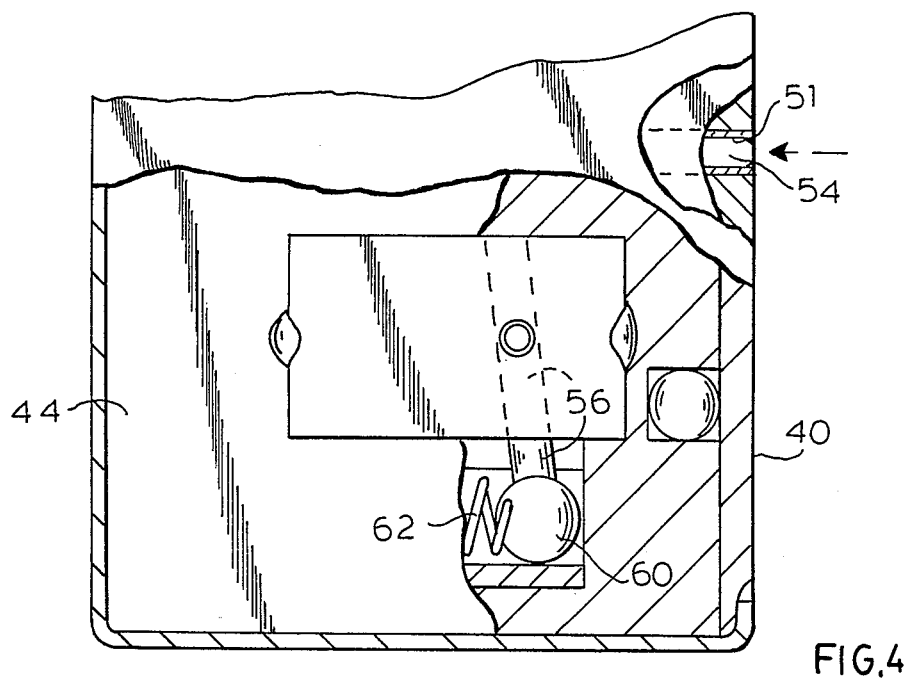
FIG. 4 is an enlarged fragmentary view including the end of the D-shaft and the mounting plate supporting the D-shaft.
Figure 3:
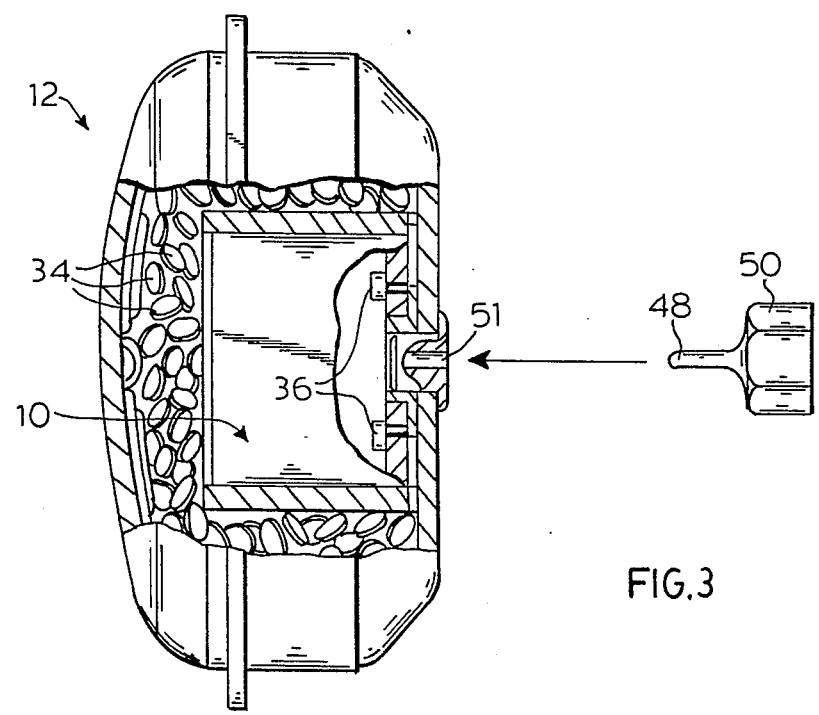
FIG. 3 is a side elevational view of the sensor with the gas generator with certain parts broken away removed and with a pin extending from a steering wheel nut employed for enabling the sensor when the wheel is mounted.
Figure 5:
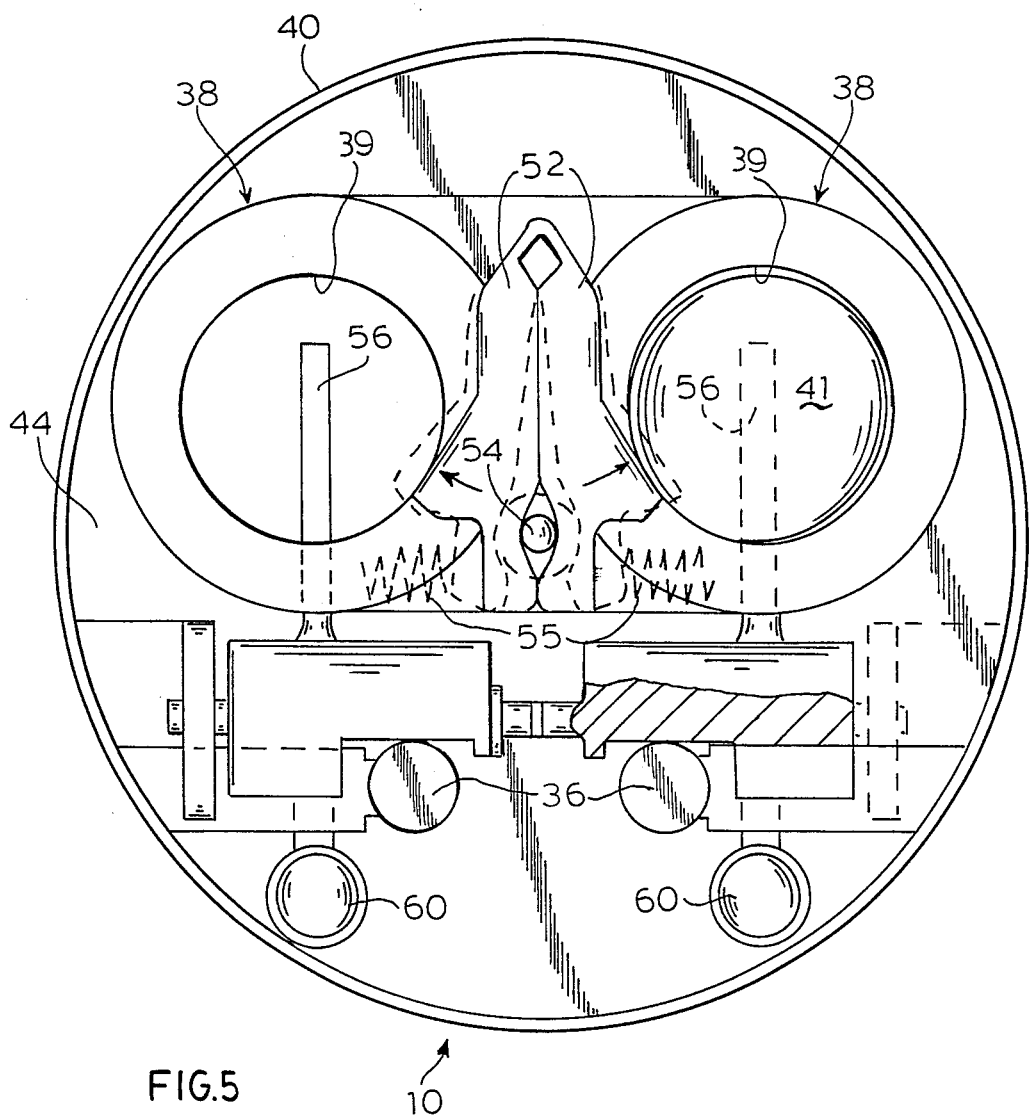
FIG. 5 is a top plan view of the sensor with the cover removed and other parts broken away and removed showing the sensor armed and with dashed lines showing position of the safing arms of the sensor when it is safe.
Figure 8:
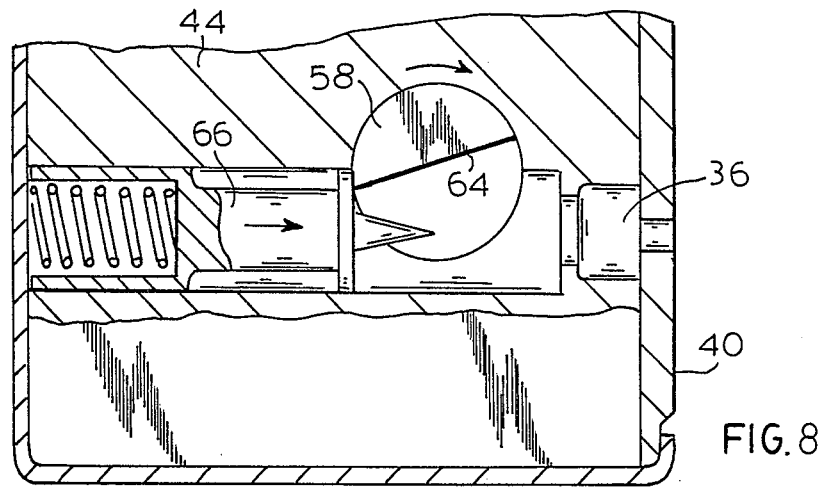
FIG. 8 is an enlarged fragmentary view of the firing pin held in a retracted position by the D-shaft.
Figure 9:
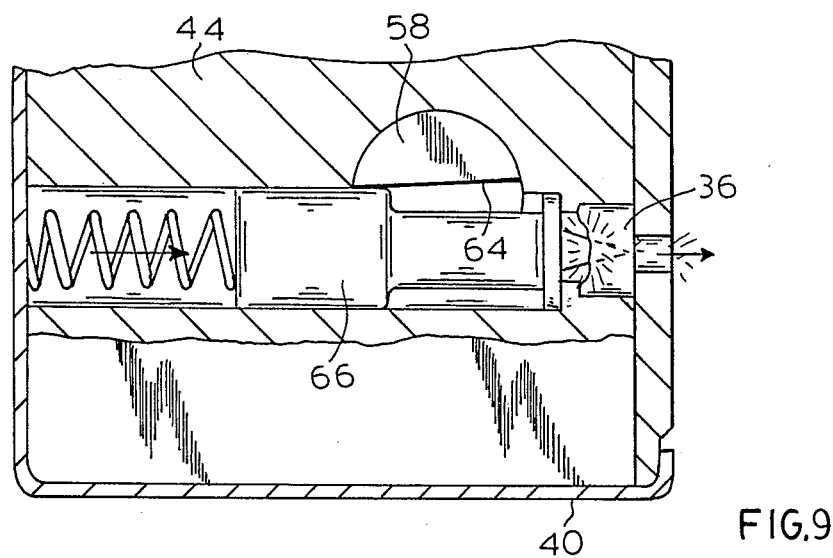
FIG. 9 is a similar view with the firing pin released after a collision is experienced.

In the drawings, air bag safety restraint systems 8 and 8' incorporating the sensor of the invention are shown mounted within the passenger compartment of a vehicle both at the driver and the passenger side. The sensor-initiator 10 is preferably mounted inside the gas generator or inflator 12. However, the sensor-initiator may be otherwise mounted but nevertheless located in the passenger compartment. The inflator 12 is symmetrically mounted on a frame 14 to which is also mounted the housing or cover 16 for the folded air bag 18. Interposed between the inflator and the air bag is a diffuser plate 20 also secured to the frame 14. The air bag housing or cover 16 is made of a frangible plastic material and encloses and protects folded air bag 18 to prevent damage to the bag when it is stored and in its uninflated condition.

The air bag safety restraint system 8 of the present invention is mounted on the vehicle steering wheel 22 through the frame 14. The steering wheel 22 includes an outer rim 24, and a suitable number of radial spokes 28. The air bag safety restraint sytem 8' is suitably mounted on the passenger's side of the compartment.

The gas generator 12 includes housing 32 containing a gas generating material 34 which may be sodium azide. Sodium azide is stable over a wide temperature range, but when ignited decomposes, releasing a large volume of nitrogen gas.

Reference is now made to the sensor-initiator 10 shown in detail in FIGS. 4–9. In order to increase reliability, a pair of redundant damped sensors 38 are adapted to actuate respective primers 36 within the housing 40. Each sensor 38 includes a damped sensing mass 41 capable of limited movement within the cylinder 39 in the block 44 contained within the housing 40. Before the air bag safety restraint system 8 is mounted on the steering wheel 22, movement of the mass 41 within the respective cylinder 39 is prevented by means hereinafter described. When the system is mounted on the steering wheel, an extension 48 which is part of the nut 50 which holds steering wheel onto the steering column enters the lock pin hole 51, in the sensor-initiator 10. The pin extension 48 shifts the conical lock pin 54, permitting the sensing mass lock arms 52 to rotate out of the path of the sensing masses 41, thereby arming the system.

The locking arms 52 have a common connection and operate under the bias of springs 55 which urge the arms towards one another. The arms are kept apart and consequently in engagement with the sensing masses 41 to prevent movement of the sensing masses 41, as a result of the conical shape of lock pin 54. When the sensors are rendered safe, the larger diameter part of the conical pin 54 is engaged with the arms 52 to thereby keep them apart and consequently in engagement with the sensing masses 41. When the pin 54 is moved inwardly the smaller diameter of the conical shape of the lock pin 54 is exposed to the arms which when under the influence of the springs 55 are moved towards one another to thereby free the sensing masses 41. As explained previously, the inward movement of the conical pin 54 is caused by the pin 48 of the steering wheel nut 50.

Each sensing mass 41 is associated with a pin 56 extending from a "D-shaft" 58. The other end of the pin 56 includes the spherical ball 60 in engagement with a biasing spring 62 to assure the interengagement of pin 56 with its associated sensing mass 41. Each D-shaft 58 is provided with a face 64 formed in a generally cylindrically shaped surface. In addition, a spring biased firing pin 66 is in alignement with the primer 36 and is maintained in its retracted position by the cylindrically shaped portion of the D-shaft 58 and is permitted to be released when aligned with the face 64.

In the event that an automobile experiences a crash, each sensing mass 41 moves to the right as shown in FIG. 7. However, this motion is resisted by the bias spring 62 acting through the pin 56 and by the air pressure differential between the left and right sides of the sensing mass 41. This pressure is gradually relieved by virtue of the air flowing in the clearance between the sensing mass 41 and cylinder 38. If the crash is of sufficient severity, the mass 41 will move sufficiently to the right to cause the D-shaft 58 to rotate enough to clear the firing pin 66 and permit it to move passed face 64 and impact primer 36 which ignites to initiate the ignition of leads 68 which cooperate initiating the buring of the gas generate material 34, which, in turn, inflates the air bag.

Figure 10:
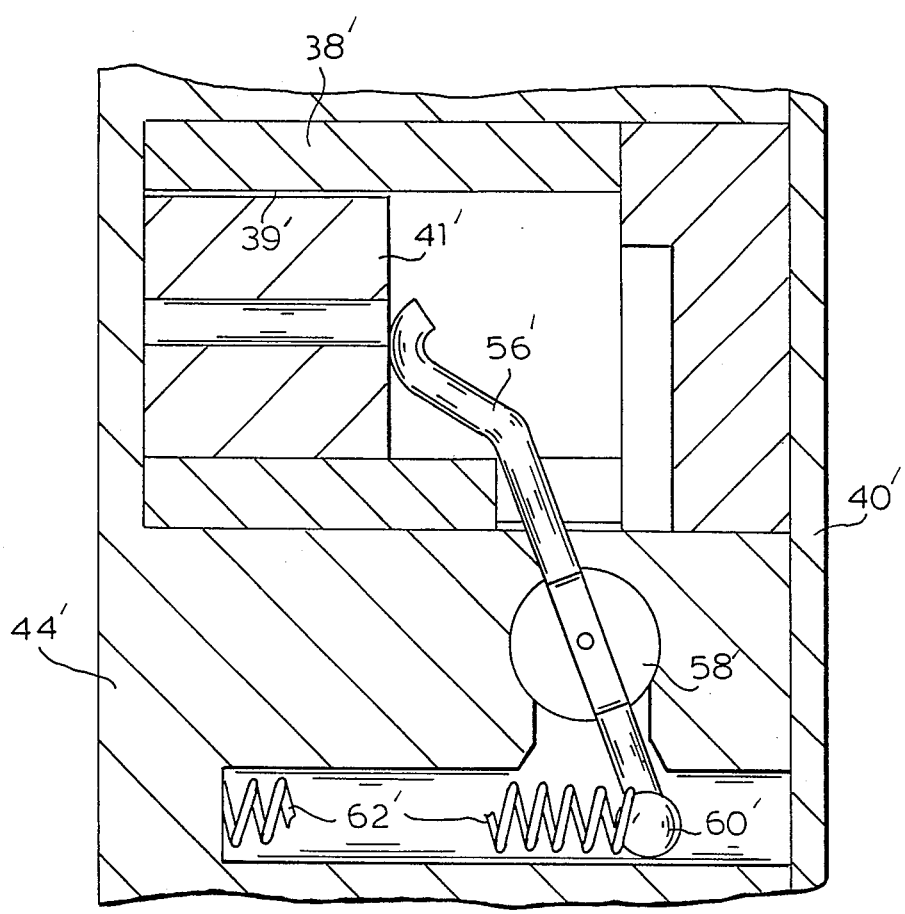
FIG. 10 is a view similar to FIG. 6 showing an alternate embodiment of the sensor of this invention which is an undamped spring mass sensor.

In FIG. 10, a pure spring mass sensor is shown having an essentially undamped sensing mass 41', which normally will travel a longer distance than in the case of damped spring mass sensors. In all other respects this sensor initiator is the same as sensor initiator 10 of FIGS. 4–9 and like numerals will be used with accompanying primes for corresponding parts.

Figure 11:
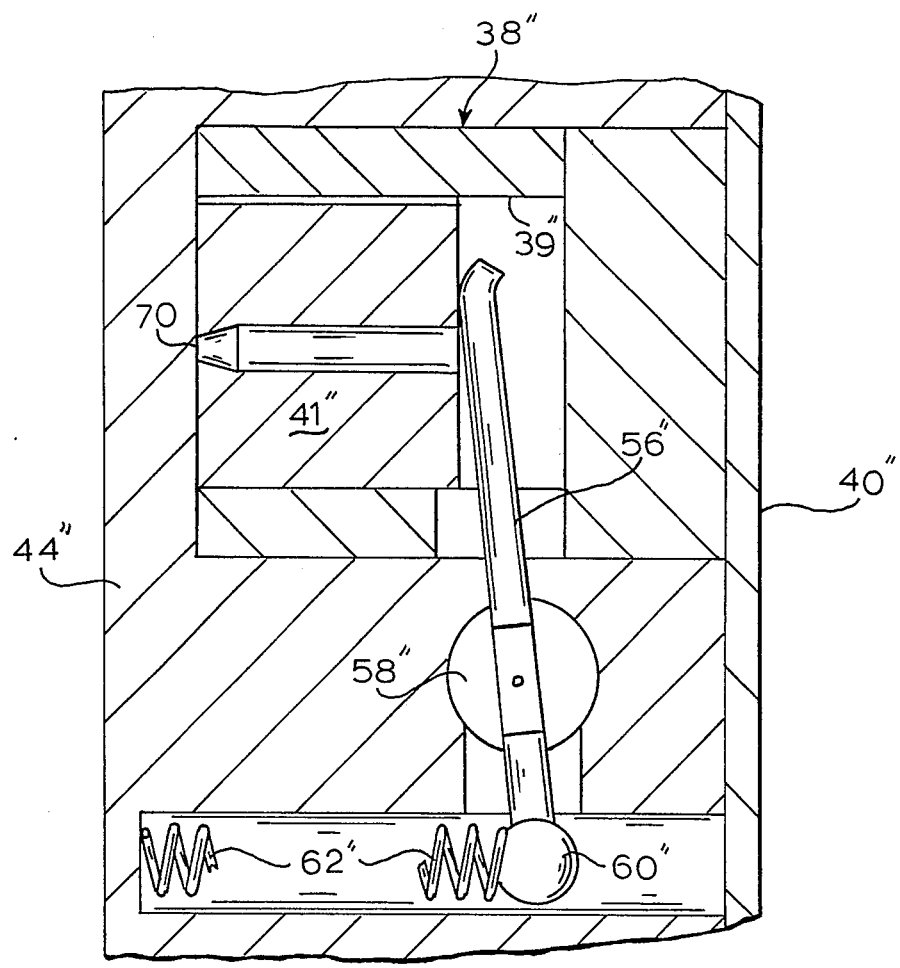
FIG. 11 is a view similar to FIGS. 6 and 10 showing another embodiment of a damped sensor using a sharp edge orifice in the center of the piston.

In FIG. 11 a damped spring mass sensor is shown where the damping is created by the sharp edge orifice 70 in the center of the piston such as is disclosed in U.S. Pat. No. 3,563,024. In all other respects this sensor initiator is the same as sensor initiator 10 of FIGS 4–9 and like numerals will be used with accompanying double primes for corresponding parts.

In both cases where the piston is cylindrical a low coefficient of friction coating, such as Teflon must be used to minimize the effects of friction.

With respect to all sensors incorporating the teachings of the invention and particularly the spring mass sensors whether damped or undamped, relatively low biases, preferably around 4 g and less than 7 g are contemplated because of their location within the vehicle passenger compartment. In addition the sensors of the invention are velocity change detectors in the same that they require a substantial velocity change to take place after the bias acceleration has been exceeded which requires that the acceleration be sustained above the bias for an extended period of time. Normally this time is determined by the acceleration level and will range from 5 to 100 milliseconds. In this manner, unnecessary air bag deployment will be minimized and then the air bag will be deployed when needed in cases involving long low acceleration crash pulses such as result from impacts with crash cushions.

Acceleration as used herein means acceleration of the vehicle in the reverse direction as would occur in a crash where the velocity of the vehicle is reduced or when a vehicle is struck in the front causing it to accelerate backwards. Sustained acceleration as used herein means that the acceleration average over the stated time period is above the bias acceleration. It should be understood that crash acceleration traces typically contain high frequency fluctuations. Primers as used herein includes any pyrotechnic device such as stab primers, stab detonator or electric squibs. Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. A mechanical sensor with a low bias for mounting within a vehicle passenger compartment operable without electrical power for igniting the pyrotechnic element of an air bag safety restraint system for the vehicle, said sensor comprising a sensor train which includes:
   a primer;
   a spring biased firing pin;
   a means responsive to sustained acceleration above the bias for releasing the firing pin to strike the primer.

2. The invention is accordance with claim 1, wherein lock means are provided for locking the sensing mass and rendering the sensor safe prior to mounting the sensor on the vehicle.

3. The invention in accordance with the claim 1, wherein the sensor is provided with means for mounting the sensor in the passenger compartment of a vehicle.

4. The invention in accordance with claim 1, wherein the sensor has biasing means providing a relatively low g bias.

5. The invention in accordance with claim 4, wherein the means responsive to sustained acceleration comprises a movable sensing mass, a rotatable shaft, means for translating movement of the sensing mass to rotation of the shaft, the spring biased firing pin being maintained in a retracted position by the shaft and being released to strike a primer upon predetermined rotation of the shaft.

6. The invention in accordance with claim 5, wherein the sensing mass is adapted for limited movement within a cavity in the sensor and the biasing means is a spring.

7. The invention in accordance with claim 5, wherein damping means is also provided for resisting the movement of the sensing mass within the cavity.

8. The invention in accordance with claim 7, wherein the damping means includes a sharp edge orifice in the mass through which fluid is adapted to flow upon movement of the mass.

9. The invention in accordance with claim 5, wherein the means for translating movement of the sensing mass to rotation of the shaft includes a radially extending pin on the shaft which is adapted to engage the mass and be biased so as to resist movement of the sensing mass.

10. The invention in accordance with claim 9, wherein the pin is provided with a diametrically opposed extension extending beyond the shaft, the biasing means includes a biasing spring and means on the end of the extension in engagement with the spring whereby the pin is urged against the sensing mass.

11. The invention in accordance with claim 5, wherein the shaft is a "D-shaft" including a face which provides clearance for the firing pin when the shaft is rotated a predetermined amount.

12. The invention in accordance with claim 1, wherein two sensor trains in parallel are used to provide redundant sensing trains for sensing a crash and initiating air bag inflation.

13. The invention in accordance with claim 4, wherein the bias of the biasing means is less than 7 g.

14. The invention in accordance with claim 13, wherein the maximum bias of the biasing means is about 4 g.

15. The invention in accordance with claim 1, wherein the sustained acceleration is sustained for a period ranging from 5 to 100 milliseconds.

* * * * *

UNITED STATES PATENT AND TRADEMARK OFFICE
CERTIFICATE OF CORRECTION

PATENT NO. : 4,573,706
DATED : March 4, 1986
INVENTOR(S) : David S. Breed

It is certified that error appears in the above-identified patent and that said Letters Patent is hereby corrected as shown below:

At Column 2, line 30, after "air bag" insert --are--.

Column 3, line 9, "means" should be --mass--.

Column 3, line 49, after "ignited" insert --rapidly--.

Column 3, line 63, after "holds" insert --the--.

Column 4, line 52, "edge" should be --edged--.

Column 5, line 16, "average" should be --averaged--.

Signed and Sealed this

Fifth Day of August 1986

[SEAL]

Attest:

DONALD J. QUIGG

Attesting Officer

Commissioner of Patents and Trademarks